United States Patent
Ryu et al.

(10) Patent No.: US 9,438,804 B2
(45) Date of Patent: Sep. 6, 2016

(54) DEVICE AND METHOD FOR REMOVING DISTORTION

(71) Applicant: Hanwha Techwin Co., Ltd., Changwon (KR)

(72) Inventors: Yeon Geol Ryu, Changwon (KR); Sang Ji Park, Changwon (KR); Hwal Suk Lee, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 148 days.

(21) Appl. No.: 14/226,153

(22) Filed: Mar. 26, 2014

(65) Prior Publication Data

US 2015/0062357 A1    Mar. 5, 2015

(30) Foreign Application Priority Data

Aug. 27, 2013   (KR) .................. 10-2013-0102021

(51) Int. Cl.
*H04N 5/232*    (2006.01)
*H04N 5/374*    (2011.01)

(52) U.S. Cl.
CPC ........ *H04N 5/2329* (2013.01); *H04N 5/23254* (2013.01); *H04N 5/23267* (2013.01); *H04N 5/374* (2013.01)

(58) Field of Classification Search
CPC .................................................. H04N 5/2329
USPC ...................................................... 348/208.1
See application file for complete search history.

(56) References Cited

U.S. PATENT DOCUMENTS

| 8,350,922 B2 | 1/2013 | D'Angelo et al. |
| 2012/0033098 A1 | 2/2012 | Matsuyama |
| 2012/0092559 A1 | 4/2012 | Ubillos |
| 2013/0011020 A1* | 1/2013 | Kamoshida ........ H04N 5/23267 382/107 |

FOREIGN PATENT DOCUMENTS

KR    10-2013-0031308 A    3/2013

* cited by examiner

*Primary Examiner* — Twyler Haskins
*Assistant Examiner* — Fayez Bhuiyan
(74) *Attorney, Agent, or Firm* — Sughrue Mion, PLLC

(57) ABSTRACT

Provided are a device and method for removing distortion in a photographed image. The method includes estimating a parameter set indicative of an amount of distortion in an input image by a local motion vector between a reference image and the input image, and reconstructing the input image by using the estimated parameter set.

16 Claims, 5 Drawing Sheets

DEVICE AND METHOD FOR REMOVING DISTORTION

CROSS REFERENCE TO RELATED APPLICATION

This application claims priority from Korean Patent Application No. 10-2013-0102021, filed on Aug. 27, 2013, in the Korean Intellectual Property Office, the disclosure of which is incorporated herein in its entirety by reference.

BACKGROUND

1. Field

Apparatuses and methods consistent with exemplary embodiments of the inventive concept relate to removing distortions in a camera image, and more particularly, to removing wobbling caused by a rolling shutter used in a complementary metal-oxide-semiconductor (CMOS) sensor of the camera.

2. Description of the Related Art

A rolling shutter mode is a method of image acquisition in which each image frame is recorded by scanning across the image frame either vertically or horizontally. In the rolling shutter mode, the readout proceeds row-by-row, sequentially from top to bottom.

In the rolling shutter mode, the top row of pixels is the first one to start collecting the light and is the first one to finish collecting the light. The start and end of the light collection for each following row is slightly delayed, thereby causing distortions such as skew or wobbling.

One approach to removing such distortions caused by a rolling shutter includes calculating a position of a camera in a two- or three-dimensional space for every frame, determining a position of the camera for each scan line by using parameters of a CMOS sensor such as frame rate, readout time, and frame delay time, and correcting the distortions caused by the rolling shutter. However, this method has a drawback in that the CMOS sensor has to be calibrated prior to correction of rolling shutter distortions, and the performance of the correction is affected by accuracy of the calibration of the CMOS sensor.

SUMMARY

One or more exemplary embodiments provide a device and method for removing distortions such as skew or wobbling caused by a rolling shutter mode used in a complementary metal-oxide-semiconductor (CMOS) sensor.

Various aspects of the embodiments will be set forth in part in the description which follows and, in part, will be apparent from the description, or may be learned by practice of the embodiments.

According to an aspect of an exemplary embodiment, there is provided a device for removing distortion which includes: a photographing unit configured to photograph a plurality of frames in succession by using a rolling shutter; a storage unit configured to store photographed images of the plurality of frames; a local motion vector generator configured to generate a local motion vector between a reference image and an input image among the photographed images; a parameter estimator configured to estimate a parameter set indicative of an amount of distortion in the input image in view of the reference image, based on the local motion vector; and an image reconstruction unit configured to generate a reconstructed image by using the estimated parameter set and information about the input image.

The parameter estimator may estimate the parameter set by selecting at least one scan line in the reference image and at least one corresponding line in the input image, wherein the parameter set is a set of variables representing coordinates of a start point and an end point of the corresponding line in the input image.

The parameter estimator may estimate the parameter set by selecting at least one point present on the scan line in the reference image and at least one corresponding point in the corresponding line in the input image.

The parameter estimator may select the corresponding point based on the local motion vector.

The parameter estimator may estimate the parameter set by selecting the point and the corresponding point such that the two points internally divide the scan line in the reference image and the corresponding line in the input image in the same ratio, respectively.

The parameter estimator may estimate the parameter by setting all points in the corresponding line by functions of a y-coordinate of the scan line in the reference image.

The parameter estimator may calculate coordinates of the corresponding point in the input image by using a linear equation in the form of $Ax=b$, where $A$ is a matrix represented by a function of a y-coordinate of the scan line, $x$ is the parameter set, and $b$ is coordinates of the corresponding point in the input image.

The image reconstruction unit may search for at least one point in the input image corresponding to at least one arbitrary point in the reconstructed image by using the estimated parameter set, and generates the reconstructed image by using a pixel value of the at least one point in the input image.

According to an aspect of another exemplary embodiment, there is provided a method of removing distortion from an input image in a device for removing the distortion, which may include: storing a plurality of frames photographed in succession by a photographing unit by using a rolling shutter, in a storage unit; generating a local motion vector between a reference image and an input image among the photographed images in a local motion vector generator; estimating a parameter set to determine an amount of distortion in the input image in view of the reference image, based on the local motion vector, in the wobbling parameter estimator; and generating a reconstructed image by using the estimated parameter set and information about the input image in the image reconstruction unit.

In the estimating the parameter set, the parameter set may be estimated by selecting at least one scan line in the reference image and at least one corresponding line in the input image, wherein the parameter set is a set of variables representing coordinates of a start point and an end point of the corresponding line in the input image.

In the estimating the parameter set, the parameter set may be estimated by selecting at least one point present on the scan line in the reference image and at least one corresponding point in the corresponding line in the input image.

In the estimating the parameter set, the corresponding point may be selected based on the local motion vector.

In the estimating the parameter set, the point and the corresponding point may be selected such that the two points internally divide the scan line in the reference image and the corresponding line in the input image in the same ratio, respectively.

In the estimating the parameter set, all points in the corresponding line may be set by functions of a y-coordinate of the scan line in the reference image.

In the estimating the parameter set, coordinates of the corresponding point in the input image may be calculated by using a linear equation in the form of Ax=b, where A is a matrix represented by a function of a y-coordinate of the scan line, x is the parameter set, and b is coordinates of the corresponding point in the input image.

In the generating the reconstructed image, at least one point in the input image corresponding to at least one arbitrary point in the reconstructed image may be searched for by using the estimated parameter set, and the reconstructed image is generated by using a pixel value of the at least one point in the input image.

The device and method for removing distortions according to the exe exemplary embodiments are adapted to remove all types of distortions that may occur in an imaging device. In particular, the device and method are capable of compensating for translation, in-plane rotation, scale, shearing, and projectivity vibration caused by camera vibrations and zooming such as three-axis rotation and translation in a 3D space.

The device and method are also adapted to reconstruct an image distorted by wobbling by using only local motion vectors without using information about a CMOS sensor and performing motion estimation In the device and method, the process of estimating the parameters may be performed by using a linear equation like Ax=b, and a pseudo inverse matrix may be used to find a solution to the linear equation, thereby eliminating the need for separate optimizations methods. Thus, closed-form parameter estimation may be provided.

Thereby, the device and method may be applied to various intelligent image surveillance systems which use CMOS cameras to remove distortions from the systems. The intelligent image surveillance systems are used in major national facilities such as military airports, harbors, roads, and bridges, subways, buses, buildings' roofs, stadia, parking lots, cars, mobile devices, and robots thereby removing distortions from the systems.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Figure 1:
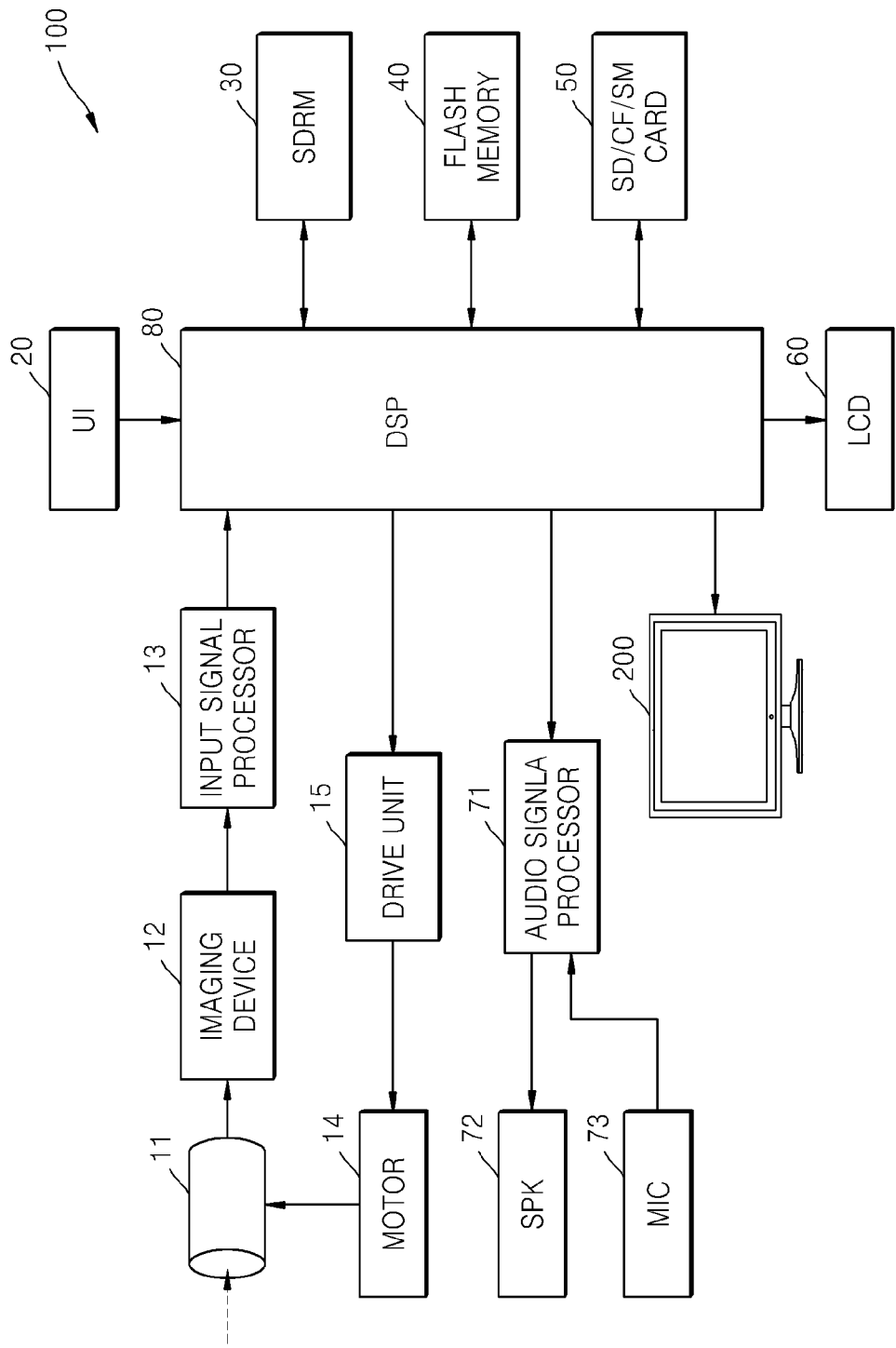
FIG. 1 is a block diagram illustrating a configuration of a digital camera according to an exemplary embodiment.

Reference will now be made in detail to the exemplary embodiments, which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

The terminology used herein is for the purpose of describing particular embodiments only and is not intended to be limiting the inventive concept. Furthermore, unless expressly so defined herein, technical terms used herein have the same meaning as commonly understood by one of ordinary skill in the art to which the embodiments belong and will not be interpreted in an overly broad or narrow sense.

It will be further understood that if technical terms used herein fail to accurately express the spirit of the inventive concept, the wrong technical terms will be replaced with correct ones that can be understood by one of ordinary skill in the art. General terms used herein should also be interpreted as having a meaning that is defined in commonly-used dictionaries or is consistent with their meaning in the context of the relevant art and will not be interpreted in an idealized or overly formal sense.

FIG. 1 is a block diagram illustrating a configuration of a digital camera 100 according to an exemplary embodiment.

Referring to FIG. 1, the digital camera 100 includes an optical unit 11 for receiving an optical signal from an object, an imaging device 12 for converting the optical signal received through the optical unit 11 into an electrical signal, an input signal processor 13 for performing signal processing operations, such as noise reduction and analog-to-digital (A/D) conversion, on the electrical signal provided by the imaging device 12, a motor 14 for driving the optical unit 11, and a drive unit 15 for controlling the operation of the motor 14.

The digital camera 100 further includes a user input unit (UI) 20 for receiving a user's manipulation signal, a synchronous dynamic random access memory (SDRAM) 30 for temporarily storing input image data, data for processing operations, and results of the processing, a flash memory 40 for storing an algorithm needed for the operation of the digital camera 100, and a Secure Digital (SD)/Compact Flash (CF)/SmartMedia (SM) card 50 as a recording device for storing image files.

The digital camera 100 is equipped with a liquid crystal display (LCD) 60 as a display unit. The digital camera 100 may further include an audio signal processor 71 for converting sound into a digital signal or a digital signal from a sound source into an analog signal, and generating an audio file, a speaker SPK 72 for outputting sound, and a microphone MIC 73 for inputting sound. The digital camera 10 further includes a digital signal processor (DSP) 80 for controlling the operation of the digital camera.

The configuration and function of each component will now be described in more detail.

The optical unit 11 may include a lens unit for focusing an optical signal, a diaphragm for adjusting the magnitude (intensity) of the optical signal, and a shutter for controlling an input of the optical signal. The lens unit includes a zoom lens for increasing or decreasing an angle of view according to a focal length and a focus lens for focusing an object to a focal point. Each of the zoom lens and the focus lens may be constructed from a single lens or a group of a plurality of lens elements. The shutter may be a mechanical shutter with a screen moving up and down. Alternatively, the imaging device 11 may be used as a shutter instead of a separate shutter by controlling the supply of an electrical signal to the imaging device 11.

The motor 14 for driving the optical unit 11 may drive setting of a lens position, opening/closing of the diaphragm, and operations of a shutter in order to perform operations such as auto focus, automatic exposure control, diaphragm adjustment, and focus change.

The drive unit 15 controls the operations of the motor 14 in response to a control signal received from the DSP 80.

The imaging device 12 receives an optical signal from the optical unit 11 and forms an image of the object.

The input signal processor 13 includes an A/D converter for converting an electrical signal supplied from the imaging device 12 such as a charge coupled device (CCD) as an analog signal into a digital signal. The input signal process may further include a circuit for performing signal processing, such as gain control or waveform shaping, on the electrical signal provided by the imaging device 12.

The DSP 80 performs image signal processing operations on input image data. The image signal processing operations may include gamma correction, color filter array interpolation, color matrix, color correction, color enhancement, estimation of wobbling parameters, and image reconstruction based on the estimated wobbling parameters. The DSP 80 also compresses image data obtained by the image signal processing into an image file or reconstructs the original image data from the image file. Images may be compressed using a reversible or irreversible algorithm.

The DSP 80 may perform the above-described image signal processing operations and control each component according to the results of the processing or in response to a user control signal input through the UI 20. According to an exemplary embodiment, the DSP 80 and the input signal processor may be constituted as a single unit.

Figure 2:
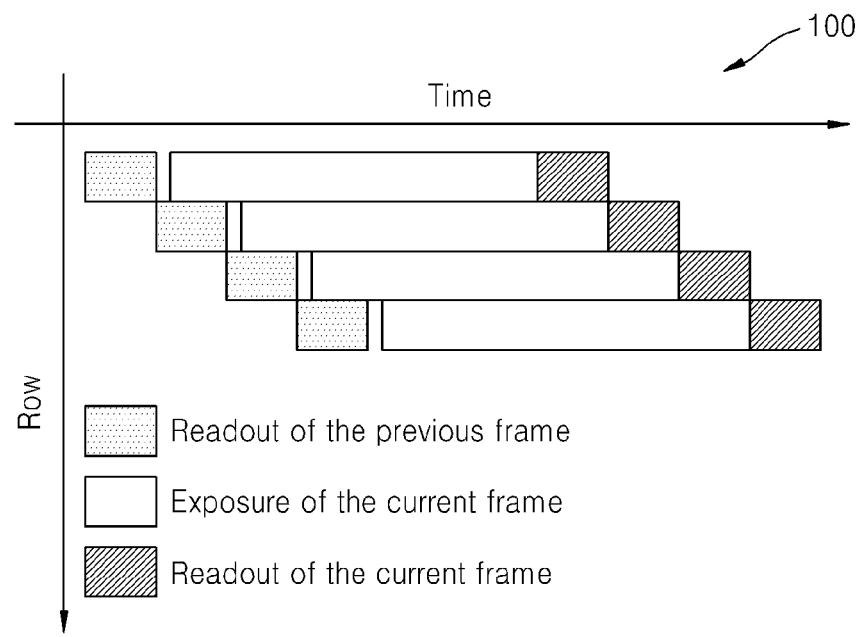
FIG. 2 illustrates acquisition of an image in a complementary metal-oxide-semiconductor (CMOS) sensor which uses a rolling shutter, according to an exemplary embodiment.
Figure 3:
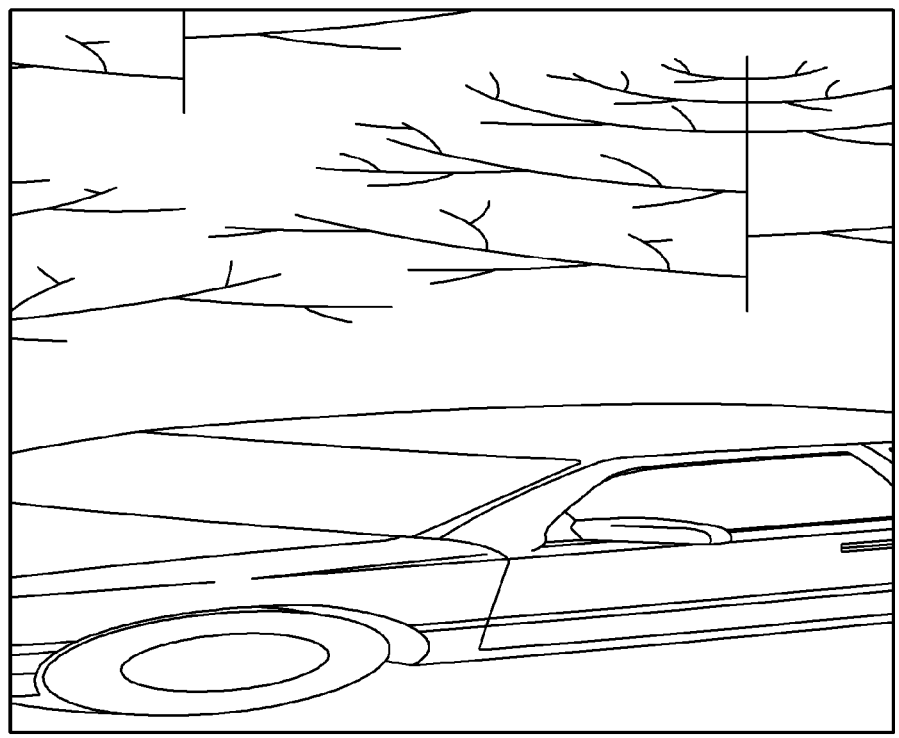
FIG. 3 illustrates an example of a wobbled input image.

FIG. 2 illustrates acquisition of an image in a complementary metal-oxide-semiconductor (CMOS) sensor according to an exemplary embodiment. Referring to FIG. 2, the CMOS sensor acquires an image for each scan line at regular intervals. FIG. 3 illustrates an example of a wobbled input image. Referring to FIG. 3, when a CMOS sensor using a rolling shutter mode acquires an image of an object, there is a difference between a time of scanning an image frame at a top portion of a shutter and a time of scanning the image frame at a bottom portion of the shutter. This time difference may exhibit skew, wobbling, and/or partial exposure as shown in FIG. 3. Thus, the content of the image may be distorted.

A method of removing the distortion caused by a rolling shutter used in a CMOS sensor according to an exemplary embodiment will now be described in more detail.

Figure 4:
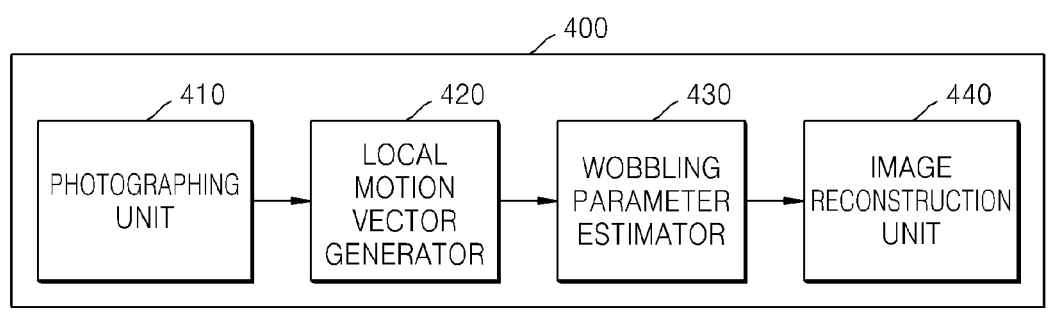
FIG. 4 illustrates an internal configuration of a device for removing distortions according to an exemplary embodiment.

FIG. 4 illustrates an internal configuration of a device 400 for removing distortions according to an exemplary embodiment.

The device 400 according to the present embodiment includes a photographing unit 410, a storage unit (not shown), a local motion vector generator 420, a wobbling parameter estimator 430, and an image reconstruction unit 440.

In the present embodiment, the storage unit stores an image taken by the photographing unit 410, and the local vector generator 420 calculates a local motion vector between a reference image and a wobbled input image. By using a value of the local motion vector, it is possible to determine a line in the wobbled input image to which an arbitrary scan line in the reference image has moved.

The wobbling parameter estimator 430 estimates a wobbling parameter set that is a set of variables indicative of the amount of distortion of the wobbled input image compared to the reference image, based on the local motion vector. A process of estimating a wobbling parameter set will be described below with reference to FIGS. 5 and 6 and Equations (1) through (16).

After estimating the wobbling parameter set indicative of the amount of distortion of the wobbled input image, the image reconstruction unit 440 reconstructs the wobbled input image based on the estimated wobbling parameter set. A process of reconstructing an input image will be described below with reference to FIG. 7 and Equations (17) and (18).

According to an exemplary embodiment, the wobble parameter estimator 430 uses two properties of a scan line scanned by a CMOS sensor to estimate a wobbling parameter set.

Figure 5:
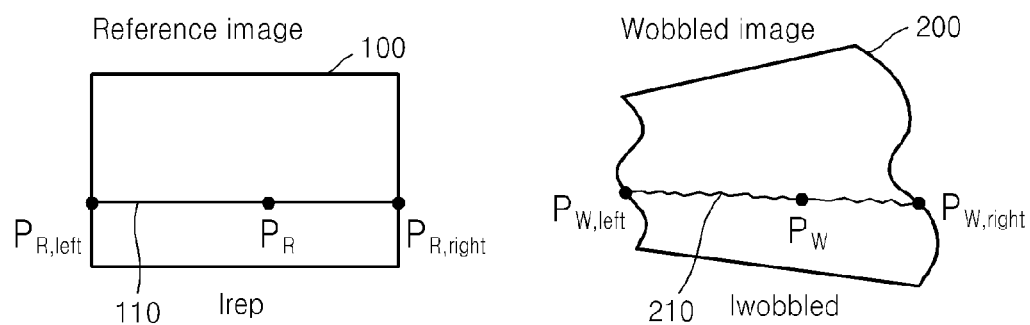
FIG. 5 illustrates a first property of a scan line by a CMOS image sensor which uses a rolling shutter, according to an exemplary embodiment.

FIG. 5 illustrates a first property of a scan line scanned by a CMOS sensor which uses a rolling shutter, according to an exemplary embodiment. Referring to FIG. 5, the first property of the scan line is that a current wobbled input image 200 has a line $I_{wobbled}$ 210 ($\overline{P_{W,left}P_{W,right}}$), connecting two end points $P_{W,left}$ and $P_{W,right}$, which corresponds to an arbitrary scan line $I_{ref}$ 110 ($\overline{P_{R,left}P_{R,right}}$) connecting two end points $P_{R,left}$ and $P_{R,right}$, in a reference image 100.

Figure 6:
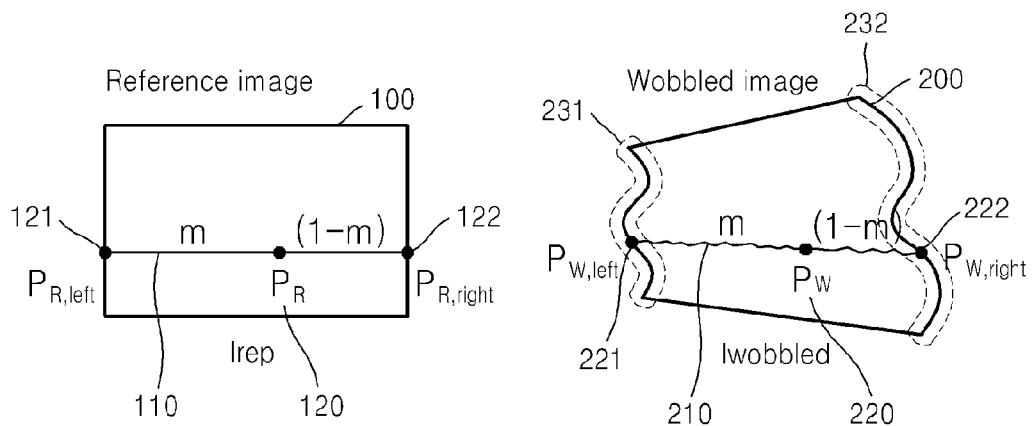
FIG. 6 illustrates a second property of a scan line by a CMOS image sensor which uses a rolling shutter, according to an exemplary embodiment.

FIG. 6 illustrates a second property of the scan line scanned by a CMOS sensor, according to an exemplary embodiment.

The second property of the scan line is that a point $P_{wobbled}$ 220 (hereinafter, referred to as '$P_W$ 220') corresponding to an arbitrary point $P_{ref}$ 120 (hereinafter, referred to as '$P_R$ 120') on the arbitrary scan line $I_{ref}$ 110 in the reference image 100 lies on the line $I_{wobbled}$ 210 in the current wobbled input image 200 corresponding to the arbitrary scan line $I_{ref}$ 110.

The two points $P_R$ 120 and $P_W$ 220 are on the arbitrary scan line $I_{ref}$ 110 in the reference image 100 and the line $I_{wobbled}$ 210 in the current wobbled input image 200, respectively. The two points $P_R$ 120 and $P_W$ 220 are located at positions that internally divide the arbitrary scan line $I_{ref}$ 110 and the line $I_{wobbled}$ 210 in a ratio of m to 1−m, respectively.

To represent the above-described two properties of the scan line by using equations, $P_R$ 120, $P_{R,left}$ 121, $P_{R,right}$ 122, $P_W$ 220, $P_{W,left}$ 221, and $P_{W,right}$ 222 are defined by Equations 1a through 1f:

$$P_R = (x_R, y_R) \tag{1a}$$

$$P_{R,left} = (x_{R,left}, y_R) \tag{1b}$$

$$P_{R,right} = (x_{R,right}, y_R) \tag{1c}$$

$$P_W = (x_W, y_W) \quad (1d)$$

$$P_{W,left} = (x_{W,left}, y_{W,left}) \quad (1e)$$

$$P_{W,right} = (x_{W,right}, y_{W,right}) \quad (1f)$$

First, the two end points $P_{W,left}$ 221 and $P_{W,right}$ 222 connected by the line $I_{wobbled}$ 210 in the current wobbled input image 200 corresponding to the arbitrary scan line $I_{ref}$ 110 in the reference image 100 are used to construct curves 231 and 232 at two sides of the current wobbled input image 200, respectively. The two end points $P_{W,left}$ 221 and $P_{W,right}$ 222 are modeled as in Equations 2a and 2b to be described later.

In this case, the two end points $P_{W,left}$ 221 and $P_{W,right}$ 222 become parts of the curves 231 and 232, respectively, because the reference image 100 is distorted in various shapes of curves due to camera vibration. However, the line $I_{wobbled}$ 210 in the current wobbled input image 200 corresponding to the arbitrary scan line $I_{ref}$ 110 may have a varying position, angle, and length, but always maintain a straight line shape.

Since all points on the arbitrary scan line $I_{ref}$ 110 are read out at the same time or substantially at the same time, and have the same y-coordinate, the two end points $P_{W,left}$ 221 and $P_{W,right}$ 222 on the line $I_{wobbled}$ 210 in the current wobbled input image 200 may be represented by functions $f_{left}(y_R)$ and $f_{right}(y_R)$ of only a y-coordinate $y_R$ of the arbitrary scan line $I_{ref}$, respectively, as shown in Equations 2a and 2b:

$$P_{W,left} = f_{left}(y_R) \quad (2a)$$

$$P_{W,right} = f_{right}(y_R) \quad (2b)$$

Equations 2a and 2b may be represented by an N-th degree polynomial like Equations 3a and 3b, respectively, as below.

$$f_{left}(y_R) = \left( \sum_{i=0}^{N} a_{x,left,i} y_R^i, \sum_{i=0}^{N} a_{y,left,i} y_R^i \right) \quad (3a)$$

$$f_{right}(y_R) = \left( \sum_{i=0}^{N} a_{x,right,i} y_R^i, \sum_{i=0}^{N} a_{y,right,i} y_R^i \right) \quad (3b)$$

In Equations 3a and 3b, N is an N-th degree polynomial, $a_{x,left,i}$ and $a_{y,left,i}$ are coefficients of an i-th degree term of the N-th degree polynomial in x- and y-coordinates $x_{W,left}$ and $y_{W,left}$ representing the point $P_{W,left}$ 221 in the current wobbled input image 200, respectively. $a_{x,right,i}$ and $a_{y,right,i}$ are coefficients of an i-th degree term of the N-th degree polynomial in x- and y-coordinates $x_{W,right}$ and $y_{W,right}$ representing the point $P_{W,right}$ 222 in the current wobbled input image 200, respectively.

Second, since the two points $P_R$ 120 and $P_W$ 220 internally divide the arbitrary scan line $I_{ref}$ 110 and the line $I_{wobbled}$ 210 in a ratio of m to 1−m, the relationship is expressed by Equation (4):

$$\overline{P_{R,left}P_R} : \overline{P_R P_{R,right}} = \overline{P_{W,left} P_W} : \overline{P_W P_{W,right}} = m:(1-m) \quad (4)$$

The m in Equation (4) may be defined by Equation (5):

$$m = x_R / \text{width} \quad (5),$$

where the width is a width length of the reference image 100.

By using Equations (4) and (5), the point $P_W$ 220 in the current wobbled input image 200 corresponding to the point $P_R$ 120 on the arbitrary scan line $I_{ref}$ 110 in the reference image 100 may be represented by Equation (6):

$$P_W = m \cdot P_{W,right} + 1 - m \cdot P_{W,left} \quad (6)$$

Equation (6) may be described in terms of x-coordinate $x_w$ and y-coordinate $y_w$ to obtain Equations 7a and 7b:

$$x_W = m \cdot x_{W,right} + (1-m) \cdot x_{W,left} = \quad (7a)$$
$$m \cdot \sum_{i=0}^{N} a_{y,left,i} y_R^i + (1-m) \cdot \sum_{i=0}^{N} a_{x,left,i} y_R^i$$

$$y_W = m \cdot y_{W,right} + (1-m) \cdot y_{W,left} = \quad (7b)$$
$$m \cdot \sum_{i=0}^{N} a_{y,right,i} y_R^i + (1-m) \cdot \sum_{i=0}^{N} a_{x,right,i} y_R^i$$

Equations 7a and 7b are applied to a number of K corresponding points to obtain Equations 8a and 8b. Equations 8a and 8b are expressed in the form of a second-degree polynomial by substituting n=2 into Equation (3). In Equations 8a and 8b, $y_{R,k}$ denotes a y-coordinate of a k-th corresponding point in the reference image 100.

$$\begin{bmatrix} m_1 & m_1 y_{R,1}^1 & m_1 y_{R,1}^2 & 1-m_1 & (1-m_1) \cdot y_{R,1}^1 & (1-m_1) \cdot y_{R,1}^2 \\ m_2 & m_1 y_{R,2}^1 & m_1 y_{R,2}^2 & 1-m_2 & (1-m_2) \cdot y_{R,2}^1 & (1-m_2) \cdot y_{R,1}^2 \\ \vdots & \vdots & \vdots & \vdots & \vdots & \vdots \\ m_K & m_1 y_{R,K}^1 & m_1 y_{R,K}^2 & 1-m_K & (1-m_K) \cdot y_{R,K}^1 & (1-m_K) \cdot y_{R,K}^2 \end{bmatrix} \times \quad (8a)$$

$$\begin{bmatrix} a_{x,right,0} \\ a_{x,right,1} \\ a_{x,right,2} \\ a_{x,left,0} \\ a_{x,left,1} \\ a_{x,left,2} \end{bmatrix} = \begin{bmatrix} x_{W,1} \\ x_{W,2} \\ \vdots \\ x_{W,1} \end{bmatrix}$$

$$\begin{bmatrix} m_1 & m_1 y_{R,1}^1 & m_1 y_{R,1}^2 & 1-m_1 & (1-m_1) \cdot y_{R,1}^1 & (1-m_1) \cdot y_{R,1}^2 \\ m_2 & m_1 y_{R,2}^1 & m_1 y_{R,2}^2 & 1-m_2 & (1-m_2) \cdot y_{R,2}^1 & (1-m_2) \cdot y_{R,1}^2 \\ \vdots & \vdots & \vdots & \vdots & \vdots & \vdots \\ m_K & m_1 y_{R,K}^1 & m_1 y_{R,K}^2 & 1-m_K & (1-m_K) \cdot y_{R,K}^1 & (1-m_K) \cdot y_{R,K}^2 \end{bmatrix} \times \quad (8b)$$

$$\begin{bmatrix} a_{y,right,0} \\ a_{y,right,1} \\ a_{y,right,2} \\ a_{y,left,0} \\ a_{y,left,1} \\ a_{y,left,2} \end{bmatrix} = \begin{bmatrix} y_{W,1} \\ y_{W,2} \\ \vdots \\ y_{W,1} \end{bmatrix}$$

The $m_k$ in Equations 8a and 8b may be defined by Equation (9):

$$m_k = x_{R,k} / \text{width} \quad (9),$$

where the width is a width length of the reference image 100.

Equations 8a and 8b may be expressed in the form of simple linear equations to obtain Equations 10a and 10b:

$$Ax_x = b_x \quad (10a)$$

$$Ax_y = b_y \quad (10a)$$

Matrix A, $b_x$, $x_x$, $b_y$, and $x_y$ in Equation (10) are defined by Equations (11) through (15) below:

$$A = \begin{bmatrix} m_1 & m_1 y_{R,1}^1 & m_1 y_{R,1}^2 & 1-m_1 & (1-m_1)\cdot y_{R,1}^1 & (1-m_1)\cdot y_{R,1}^2 \\ m_2 & m_1 y_{R,2}^1 & m_1 y_{R,2}^2 & 1-m_2 & (1-m_2)\cdot y_{R,2}^1 & (1-m_2)\cdot y_{R,1}^2 \\ \vdots & \vdots & \vdots & \vdots & \vdots & \vdots \\ m_K & m_1 y_{R,K}^1 & m_1 y_{R,K}^2 & 1-m_K & (1-m_K)\cdot y_{R,K}^1 & (1-m_K)\cdot y_{R,K}^2 \end{bmatrix} \quad (11)$$

$$b_x = [x_{W,1} \; x_{W,2} \; \ldots \; x_{W,K}]^T \quad (12)$$

$$x_x = [a_{x,right,0} \; a_{x,right,1} \; a_{x,right,2} \; a_{x,left,0} \; a_{x,left,1} \; a_{x,left,2}]^T \quad (13)$$

$$b_y = [y_{W,1} \; y_{W,2} \; \ldots \; y_{W,K}]^T \quad (14)$$

$$x_y = [a_{y,right,0} \; a_{y,right,1} \; a_{y,right,2} \; a_{y,left,0} \; a_{y,left,1} \; a_{y,left,2}]^T \quad (15)$$

Equation (10) may be solved by a Least Square Solution optimization technique as shown in Equations 16a and 16b, and have a closed form solution as shown in Equation (12).

$$\underset{x_x}{\arg\min} \| A x_x - b_x \| \rightarrow x_x = (A^T A)^{-1} A^T b_x \quad (16a)$$

$$\underset{x_y}{\arg\min} \| A x_y - b_y \| \rightarrow x_y = (A^T A)^{-1} A^T b_y \quad (16a)$$

Figure 7:
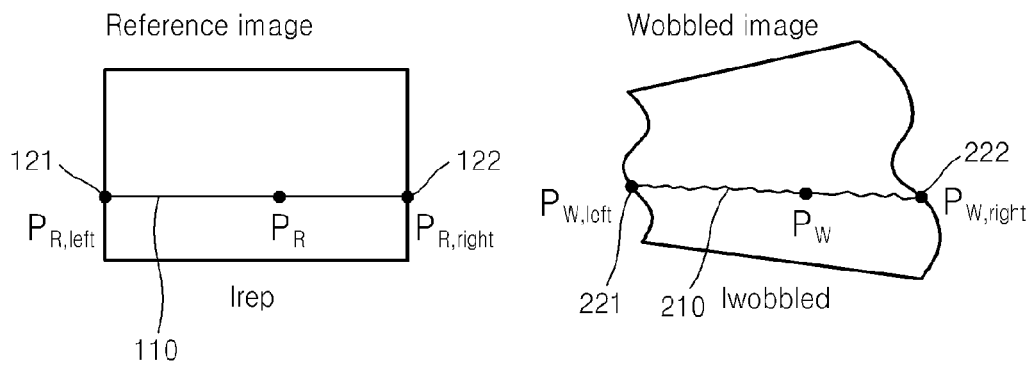
FIG. 7 illustrates a wobbling parameter set estimated to determine a line in a wobbled input image corresponding to a scan line in a reference image, according to an exemplary embodiment.

FIG. 7 illustrates a wobbling parameter set 711 through 714 calculated by using Equations 1 through 16b to determine a line $I_{wobbled}$ 210 in a wobbled input image corresponding to a scan line $I_{ref}$ 110 in a reference image, according to an exemplary embodiment.

A start point $P_{W,left}$ 221 and an end point $P_{W,right}$ 222 of the line $I_{wobbled}$ 210 in the wobbled input image corresponding to a start point $P_{R,left}$ 121 and an end point $P_{R,right}$ 122 of the scan line $I_{ref}$ 110 in the reference image may be represented by using the wobbling parameter sets 711 and 712 and 713 and 714, respectively.

Figure 8:
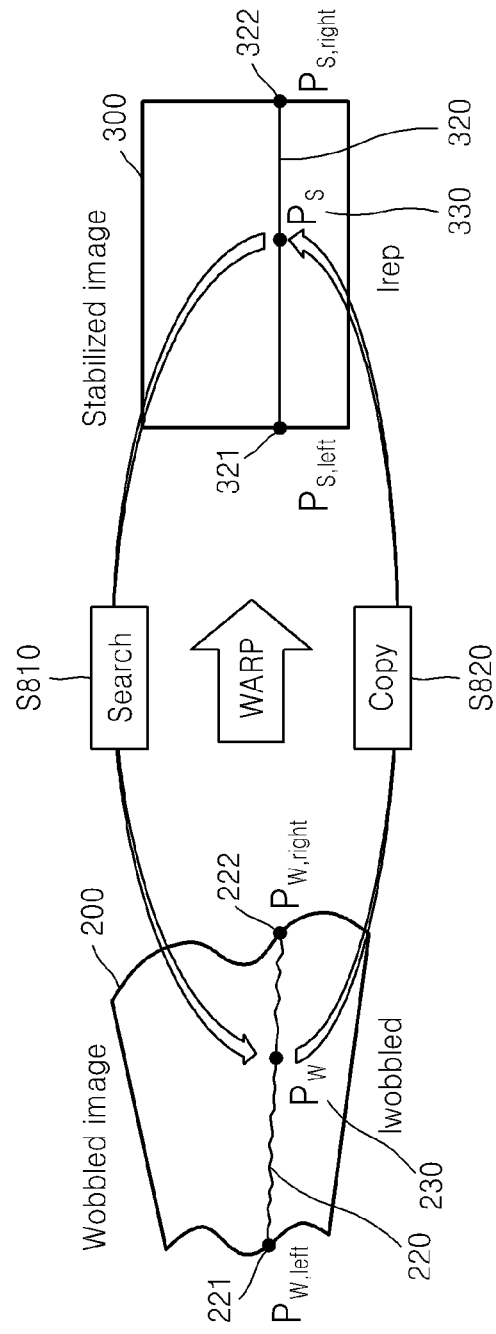
FIG. 8 illustrates reconstruction of an image using a wobbling parameter set according to an exemplary embodiment.

FIG. 8 illustrates reconstruction of an image using a wobbling parameter set according to an exemplary embodiment.

According to the present embodiment, a wobbled input image is warped to reconstruct a final stabilized image without distortion. Referring to FIG. 8, the wobbling parameter set is used to search for a point $P_W$ 230 in a wobbled input image 200 corresponding to an arbitrary point $P_S$ 330 in an image 300 to be reconstructed (S810).

When the point $P_W$ 230 is found in the wobbled input image, information about a pixel value of the point $P_W$ 230 is copied to fill a pixel value of the arbitrary point $P_S$ 330 in the image 300 to be reconstructed (S820).

More specifically, the point $P_S$ 330 in the image 300 to be reconstructed and the point $P_W$ 230 in the wobbled input image 200 corresponding thereto are represented by coordinates $(x_S, y_S)$ and coordinates $(x_W, y_W)$, respectively. In this case, the same relationship as shown in Equations 5 and 7a-7b is established between the image 300 to be reconstructed and the wobbled input image 200. The relationship may also be expressed by Equations 17a to 17c below.

Thus, the image reconstruction unit 440 in FIG. 4 may search for the point $P_W$ 230 in the wobbled input image 200 corresponding to the arbitrary point $P_S$ 330 in the image 300 to be reconstructed by using the following Equations 17a, 17b and 17c:

$$m = x_S / \text{width} \quad (17a)$$

$$x_W = m \cdot \sum_{i=0}^{N} a_{x,left,i} y_S^i + (1-m) \cdot \sum_{i=0}^{N} a_{x,left,i} y_S^i \quad (17b)$$

$$y_W = m \cdot \sum_{i=0}^{N} a_{y,left,i} y_S^i + (1-m) \cdot \sum_{i=0}^{N} a_{y,left,i} y_S^i \quad (17c)$$

After the point $P_W$ 230 corresponding to the point $P_S$ 330 in the image 300 to be reconstructed is found in the wobbled input image (S810), the image reconstruction unit 440 copies information about a pixel value of the point $P_W$ 230 and uses the pixel value of the point $P_W$ 230 as the pixel value of the arbitrary point $P_S$ 330 in the image 300 to be reconstructed, by exploiting an interpolation method as shown in the following Equation (18):

$$\text{img}(x_s, y_s) \leftarrow \text{interpolate}(\text{img}(x_w, y_w)) \quad (18),$$

where img($x_s$, $y_s$) and img($x_W$, $y_W$) respectively denote a pixel value at coordinates ($x_W$, $y_W$) in the reconstructed image 300 and a pixel value at coordinates ($x_W$, $y_W$) in the wobbled input image 200.

The terminology used herein is for the purpose of describing particular embodiments only and is not intended to limit the meaning thereof or the scope defined by the following claims. While one or more embodiments have been described with reference to the figures, it will be understood by those of ordinary skill in the art that various changes in form and details may be made therein without departing from the spirit and scope of the inventive concept as defined by the claims.

What is claimed is:

1. A device for removing distortion, the device comprising:
   a photographing unit configured to photograph a plurality of frames in succession by using a rolling shutter;
   a storage unit configured to store photographed images of the plurality of frames;
   a local motion vector generator configured to generate a local motion vector between a reference image and an input image among the photographed images;
   a parameter estimator configured to estimate a parameter set indicative of an amount of distortion in the input image in view of the reference image, based on the local motion vector; and
   an image reconstruction unit configured to generate a reconstructed image by using the estimated parameter set and information about the input image,
   wherein the parameter estimator is further configured to estimate the parameter set by selecting at least one scan line in the reference image and at least one corresponding line in the input image, and
   wherein the parameter set is a set of variables representing coordinates of a start point and an end point of the corresponding line which are located at a first curved boundary line and a second curve boundary line of the input image, respectively.

2. The device of claim 1, wherein the at least one scan line comprises a line traversing the reference image horizontally so that the start point and the end point have the same y coordinate.

3. The device of claim 1, wherein the parameter estimator estimates the parameter set by selecting at least one point present on the scan line in the reference image and at least one corresponding point in the corresponding line in the input image.

4. The device of claim 3, wherein the parameter estimator selects the corresponding point based on the local motion vector.

5. The device of claim 3, wherein the parameter estimator estimates the parameter set by selecting the point and the corresponding point such that the two points internally divide the scan line in the reference image and the corresponding line in the input image in the same ratio, respectively.

6. The device of claim 3, wherein the parameter estimator estimates the parameter set by setting all points in the corresponding line by functions of a y-coordinate of the scan line in the reference image.

7. The device of claim 6, wherein the parameter estimator calculates coordinates of the corresponding point in the input image by using a linear equation in the form of $Ax = b$, where A is a matrix represented by a function of a y-coordinate of the scan line, x is the parameter set, and b is coordinates of the corresponding point in the input image.

8. The device of claim 1, wherein the image reconstruction unit searches for at least one point in the input image corresponding to at least one arbitrary point in the reconstructed image by using the estimated parameter set, and generates the reconstructed image by using a pixel value of the at least one point in the input image.

9. A method of removing distortion from an input image in a device for removing the distortion, the method comprising:
storing a plurality of frames photographed in succession by a photographing unit by using a rolling shutter, in a storage unit;
generating a local motion vector between a reference image and an input image among the photographed images in a local motion vector generator;
estimating a parameter set to determine an amount of distortion in the input image in view of the reference image, based on the local motion vector, in the wobbling parameter estimator; and
generating a reconstructed image by using the estimated parameter set and information about the input image in the image reconstruction unit,
wherein the estimating the parameter set comprises selecting at least one scan line in the reference image and at least one corresponding line in the input image, and
wherein the parameter set is a set of variables representing coordinates of a start point and an end point of the corresponding line which are located at a first curve boundary line and a second curved boundary line of the input image, respectively.

10. The method of claim 9, wherein the at least one scan line comprises a line traversing the reference image horizontally so that the start point and the end point have the same y coordinate.

11. The method of claim 9, wherein in the estimating the parameter set, the parameter set is estimated by selecting at least one point present on the scan line in the reference image and at least one corresponding point in the corresponding line in the input image.

12. The method of claim 11, wherein in the estimating the parameter set, the corresponding point is selected based on the local motion vector.

13. The method of claim 11, wherein in the estimating the parameter set, the point and the corresponding point are selected such that the two points internally divide the scan line in the reference image and the corresponding line in the input image in the same ratio, respectively.

14. The method of claim 11, wherein in the estimating the parameter set, all points in the corresponding line are set by functions of a y-coordinate of the scan line in the reference image.

15. The method of claim 14, wherein in the estimating the parameter set, coordinates of the corresponding point in the input image are calculated by using a linear equation in the form of $Ax = b$, where A is a matrix represented by a function of a y-coordinate of the scan line, x is the parameter set, and b is coordinates of the corresponding point in the input image.

16. The method of claim 9, wherein in the generating the reconstructed image, at least one point in the input image corresponding to at least one arbitrary point in the reconstructed image is searched for by using the estimated parameter set, and the reconstructed image is generated by using a pixel value of the at least one point in the input image.

* * * * *